Feb. 3, 1970 G. N. LILES 3,493,090
MECHANISM FOR CONNECTING A ROTATABLE PRINTING HEAD TO A CHARACTER SELECTION DEVICE
Filed Feb. 26, 1968
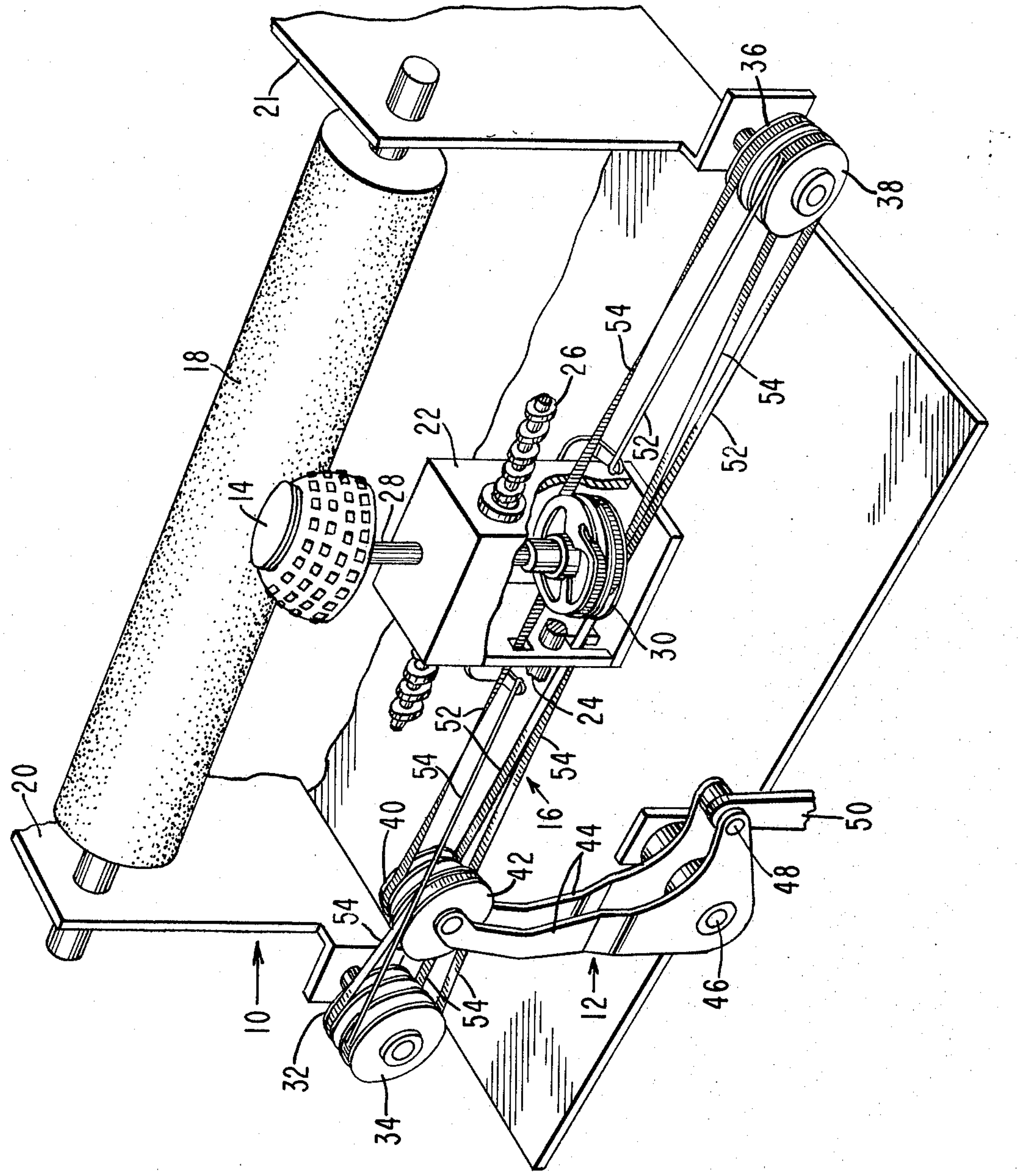
INVENTOR.
GEORGE N. LILES.
BY
Wallace F. Lamb
ATTORNEY.

United States Patent Office 3,493,090
Patented Feb. 3, 1970

3,493,090
MECHANISM FOR CONNECTING A ROTATABLE PRINTING HEAD TO A CHARACTER SELECTION DEVICE

George N. Liles, Southfield, Mich., assignor to Burroughs Corporation, Detroit, Mich., a corporation of Michigan Filed Feb. 26, 1968, Ser. No. 708,296
Int. Cl. B41j *1/60, 7/34, 23/02*
U.S. Cl. 197—16 4 Claims

ABSTRACT OF THE DISCLOSURE

The disclosure embodies a single rotatable printing head for striking a platen and operating means to rotate the head to position any one of a number of type thereon to a printing line and includes mechanism for operatively connecting the head to the operating means. The head is rotated by flexible strands which are manipulated by pulleys controllably moved by the operating means. The flexible strands are arranged such that a constant force is applied to rotate the head in both directions.

SUMMARY OF THE INVENTION

The invention resides in the provision of flexible strands for operatively connecting a rotatable printing head to operating means.

In the prior art it has been proposed to selectively position a rotatable printing head by using a flexible strand to operatively connect the head to operating means such that the operating means applies force to rotate the head in one direction via the flexible strand and that some resilient return means applies force to rotate the head in the opposite direction whenever the operating force applied to the flexible strand by the operating means is relaxed. In such systems the force required to rotate the head is not constant, being proportional to the displacement of the resilient return means, the head rotation lags the motion of the operating means, the head overtravels its position and must be returned by a force applied by the resilient return means, and changes in the length of the flexible strand due to temperature or other variations alter the position of the head.

Accordingly, it is an object of the invention to provide a mechanism with which a rotatable printing head is operatively connected to operating means such that the head is rotated in both directions by forces transmitted to it by the operating means.

It is also an object of the invention to provide a mechanism in which the force required to rotate the head is low and constant.

It is a further object of the invention to provide a mechanism in which the head will not overtravel its desired position.

It is still another object of the invention to provide a mechanism in which changes in flexible strand length due to temperature or other variations will not appreciably alter the position of the head.

In the drawing:

The drawing is a perspective view of the printing head connecting mechanism embodying features of the invention.

In accordance with the invention, an improved motion transferring mechanism is provided to achieve positive print head rotation in both directions. With reference to the drawing, the mechanism includes a supporting means or frame structure 10, an operating means 12, a rotatable printing head 14, and a connecting mechanism 16. A platen 18 and the connecting mechanism 16 may be mounted on a left upright side frame member 20 and a right upright side frame member 21. The head 14 is rotatably mounted in a differentially movable carrier 22 such that the head 14 may be positioned to a line of type and swung against the platen 18. The carrier 22 is movably supported by a shaft 24, which is fixed with respect to the frame structure 10. The carrier 22 may be differentially moved along a print line by the rotation of an elongated worm gear 26, which may be driven by any one of several well known controlled rotation motor devices.

The head 14 is pivotally secured to one end of a rotatable shaft 28. A double-grooved, driven pulley 30 is fixedly mounted on the other end of the rotatable shaft 28 and is rotatable with the head 14.

A first pair of guide pulleys 32 and 34 are mounted on the left upright frame member 20, sharing but being relatively rotatable about a common axis. A second pair of relatively rotatable guide pulleys 36 and 38 are mounted in a like manner on the right upright frame member 21. A pair of control pulleys 40 and 42 are mounted on one end of a bellcrank 44, sharing but being relatively rotatable about a common axis. The bellcrank 44 is pivotally mounted on a shaft 46, which is fixed with respect to the frame structure 10. The other end of the bellcrank 44 is pivotally connected by a pin 48 to a control link 50, which may in turn be connected to any one of several well known character selection or control devices as shown, for example, in the patent to J. E. Hickerson, No. 2,905,302, issued Sept. 22, 1959.

A first flexible connecting strand 52 is anchored at one end thereof to the differentially movable carrier 22 and drivingly connects the driven pulley 30 to the control pulley 40 around the guide pulley 38. A second flexible connecting strand 54 is anchored at one end thereof to the differentially movable carrier 22 and drivingly connects the driven pulley 30 to the control pulley 42 around the guide pulleys 32, 34, and 36.

It will be appreciated by those skilled in the art that, although the mechanism described here utilizes two flexible connecting strands 52 and 54, one strand could be employed provided it be affixed to the driven pulley 30 and to the carrier 22 at respectively appropriate points along its length.

OPERATION

With reference to the drawing, assuming that the mechanism is to rotate the printing head 14 in a clockwise direction, the control link 50 is moved in a downward direction an amount specified by the character selection device used. This pivots the bellcrank 44 in a clockwise direction around the shaft 46. The control pulleys 42 and 46 are moved to the right by the bellcrank 44.

As the control pulley 42 is moved, it produces a tension in the flexible connecting strand 54. This tension is transmitted by the strand 54, around guide pulleys 32 and 36, to apply a torque to the driven pulley 30, rotating it and the head 14 connected thereto by the shaft 28 in a clockwise direction. As the driven pulley 30 is rotated in a clockwise direction, a length of the strand 54 will be unwrapped from it to permit the travel of the control pulley 42. Also as the driven pulley 30 is rotating in a clockwise direction, a length of the strand 52 will be wrapped around it to take up the slack in the strand 52 produced by the movement of the control pulley 40. When the motion of the control pulleys 40 and 42 is stopped, the strand 52 halts the clockwise rotation of the driven pulley 30 and, therefore, of the head 14 in the position desired, thus eliminating overtravel.

A similar procedure is followed to rotate the head 14 in a counterclockwise direction except that the control pulleys 40 and 42 are moved in the opposite direction, producing a tension this time in the strand 52. This tension applies a torque to the driven pulley 30, rotating it in a counterclockwise direction. The strand 54 acts to halt the rotation when the motion of the control pulley 30 is stopped. The connecting mechanism 16 thus transmits forces from the control means to the head 14, positively rotating it in either direction desired and stopping it when it reaches its desired position.

It should be noted that, since the movement of the strands 52 and 54 required to rotate the head 14 need be relative only to the carrier 22, or more specifically to the driven pulley 30, the carrier 22 may be in motion or at rest with respect to the platen at the time the head 14 is being rotated.

Since the two strands 52 and 54 are of nearly equal length, any changes in their respective lengths due to temperature or other variations will also be nearly equal and will not appreciably alter the position of the head 14.

Since a positive force is applied to rotate the head 14 in both directions, there being no resilient return means as used in some connecting mechanisms, there is no opposing force other than that resulting from the friction of the pulleys and bearings. This permits operation with low and constant forces, thus reducing the rate of component wear and increasing the span of time over which the mechanism will maintain operable accuracy.

What is claimed is:

1. In printing apparatus having a printing head rotatable to position any one of a number of type thereon to a printing line and having operating means to rotate the head, a mechanism for operatively connecting the head to the operating means comprising supporting means, a first pair of guide pulleys relatively rotatable about a common axis, a second pair of guide pulleys spaced from said first pair and relatively rotatable about a common axis, a driven pulley for connection to and rotatable with the printing head, a pair of movable control pulleys relatively rotatable about a common axis for connection to the operating means, a first flexible connecting strand anchored at one end thereof to said supporting means and drivingly connecting said driven pulley to one of said control pulleys around one of the guide pulleys of said first pair, and a second flexible connecting strand anchored at one end thereof to said supporting means and drivingly connecting said driven pulley to the other of said control pulleys around the other ones of said guide pulleys.

2. In printing apparatus, a mechanism as defined by claim 1 wherein said control pulleys are located between said first and second pairs of guide pulleys.

3. In printing apparatus, a mechanism as defined by claim 1 wherein said driven pulley is located between said first and second pairs of guide pulleys.

4. In printing apparatus, supporting means, a first pair of guide pulleys relatively rotatable about a common axis, a second pair of guide pulleys relatively rotatable about a common axis and spaced from said first pair of pulleys, a carrier movable between said first and second pairs of pulleys along a print line transverse to the axes of said pairs of pulleys, a print head rotatably mounted on said carrier and rotatable to present a selected one of printing type thereon to a print position, a driven pulley affixed to said head, a pair of control pulleys relatively rotatable about a common axis and movable together, a flexible connecting strand having one end connected to said carrier and extending around one of said first pair of guide pulleys and around one of said control pulleys and connected to said driven pulley, a second flexible connecting strand having one end connected to said carrier and extending around the other ones of said guide pulleys and around the other of said control pulleys and connected to said drive pulley.

References Cited

UNITED STATES PATENTS

| | | | |
|---|---|---|---|
| 2,905,302 | 9/1959 | Hickerson | 197—52 |
| 3,157,265 | 11/1964 | Palmer | 197—16 |
| 3,352,398 | 11/1967 | Crutcher et al. | 197—16 |
| 3,422,945 | 1/1969 | Bethune | 197—16 |

OTHER REFERENCES

IBM Technical Disclosure Bulletin, vol. 8, No. 10, March 1966, p. 1425, Article by T. D. Abbott et al. entitled "Cord Tensioning Device."

EDGAR S. BURR, Primary Examiner

U.S. Cl. X.R.

178—34; 197—52